US009442718B1

(12) United States Patent
Wang et al.

(10) Patent No.: US 9,442,718 B1
(45) Date of Patent: Sep. 13, 2016

(54) SYSTEM FOR ASSISTING IN LOCATING CHANGES IN SOURCE CODE VERSION CONTROL SYSTEM

(71) Applicants: Shichao Wang, Beijing (CN); Bolt Zhang, Beijing (CN); Kevin Liu, Beijing (CN); Justin Tian, Beijing (CN)

(72) Inventors: Shichao Wang, Beijing (CN); Bolt Zhang, Beijing (CN); Kevin Liu, Beijing (CN); Justin Tian, Beijing (CN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/193,908

(22) Filed: Feb. 28, 2014

(51) Int. Cl.
*G06F 9/44* (2006.01)

(52) U.S. Cl.
CPC ...................... *G06F 8/71* (2013.01)

(58) Field of Classification Search
CPC .................. G06F 8/70–8/72; G06F 9/427
See application file for complete search history.

(56) References Cited

U.S. PATENT DOCUMENTS

| 5,671,416 | A * | 9/1997 | Elson ............................ 717/106 |
| 6,360,358 | B1 * | 3/2002 | Elsbree ...................... G06F 8/71 707/999.102 |
| 7,143,345 | B2 * | 11/2006 | McKnight et al. ........... 715/234 |
| 8,291,374 | B2 * | 10/2012 | Cullum et al. ................ 717/106 |
| 8,375,361 | B2 | 2/2013 | Bell et al. |
| 8,775,392 | B1 * | 7/2014 | Walker ............... G06F 17/30144 707/695 |
| 2003/0084425 | A1 * | 5/2003 | Glaser ..................... G06F 8/433 717/110 |
| 2003/0110472 | A1 * | 6/2003 | Alloing et al. ............... 717/122 |
| 2005/0028143 | A1 * | 2/2005 | Aridor et al. ................. 717/122 |
| 2006/0009962 | A1 * | 1/2006 | Monk ................................ 704/4 |
| 2007/0006152 | A1 * | 1/2007 | Ahmed ...................... G06F 8/71 717/122 |
| 2009/0293043 | A1 * | 11/2009 | Begel et al. ................... 717/122 |
| 2011/0246968 | A1 * | 10/2011 | Zhang ...................... G06F 8/751 717/125 |
| 2012/0192151 | A1 * | 7/2012 | Parkes ....................... G06F 8/34 717/120 |
| 2013/0145343 | A1 * | 6/2013 | Warren ..................... G06F 8/30 717/101 |
| 2014/0074807 | A1 * | 3/2014 | Kane-Esrig ............... G06F 8/71 707/695 |

* cited by examiner

*Primary Examiner* — Matthew Brophy
(74) *Attorney, Agent, or Firm* — Baker Botts L.L.P.

(57) ABSTRACT

A method for providing a source code version control system may comprise parsing source code of a software product to format the software product into a tree structure comprising a plurality of components. The method may comprise separating each of the plurality of components among the tree structure based upon respective content, and receiving an updated version of a component. In addition, the method may comprise comparing the updated version of the component to a previously checked-out version of the component to identify changes, and associating the changes with the respective content of the updated version of the component. Further, the method may comprise storing the identified changes of the updated version of the component, updating the tree structure, and presenting, based on a selected component, the updated version of the component, the identified changes with the updated version of the component, and the previously checked-out version of the component.

14 Claims, 5 Drawing Sheets

SYSTEM FOR ASSISTING IN LOCATING CHANGES IN SOURCE CODE VERSION CONTROL SYSTEM

BACKGROUND

The disclosure relates generally to identifying changes within different versions of a source code, and more specifically to a system and method for identifying and formatting changes using a tree structure based on the content of the changes.

Existing systems focus on identifying changes between a check-in component and a check-out component, and how to output the changes via a browser or other container. Such a system requires comparing code and/or component versions one by one. However, when several sets of changes are made to the code or component, it may be difficult and inefficient to compare the code and/or component versions one by one.

SUMMARY

According to one embodiment of the disclosure, a method for providing a source code version control system may comprise parsing source code of a software product to format the software product into a tree structure comprising a plurality of components, each component comprising respective content. The method may comprise separating each of the plurality of components among the tree structure based upon the respective content, and receiving, at a source code repository, an updated version of a component of the plurality of components. In addition, the method may comprise comparing the updated version of the component to a previously checked-out version of the component to identify changes, and associating the identified changes with the respective content of the updated version of the component. Further, the method may comprise storing the identified changes of the updated version of the component, updating the tree structure by replacing the previously checked-out version of the component with the updated version of the component, and presenting, based on a selected component, the updated version of the component, the identified changes with the updated version of the component, and the previously checked-out version of the component.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
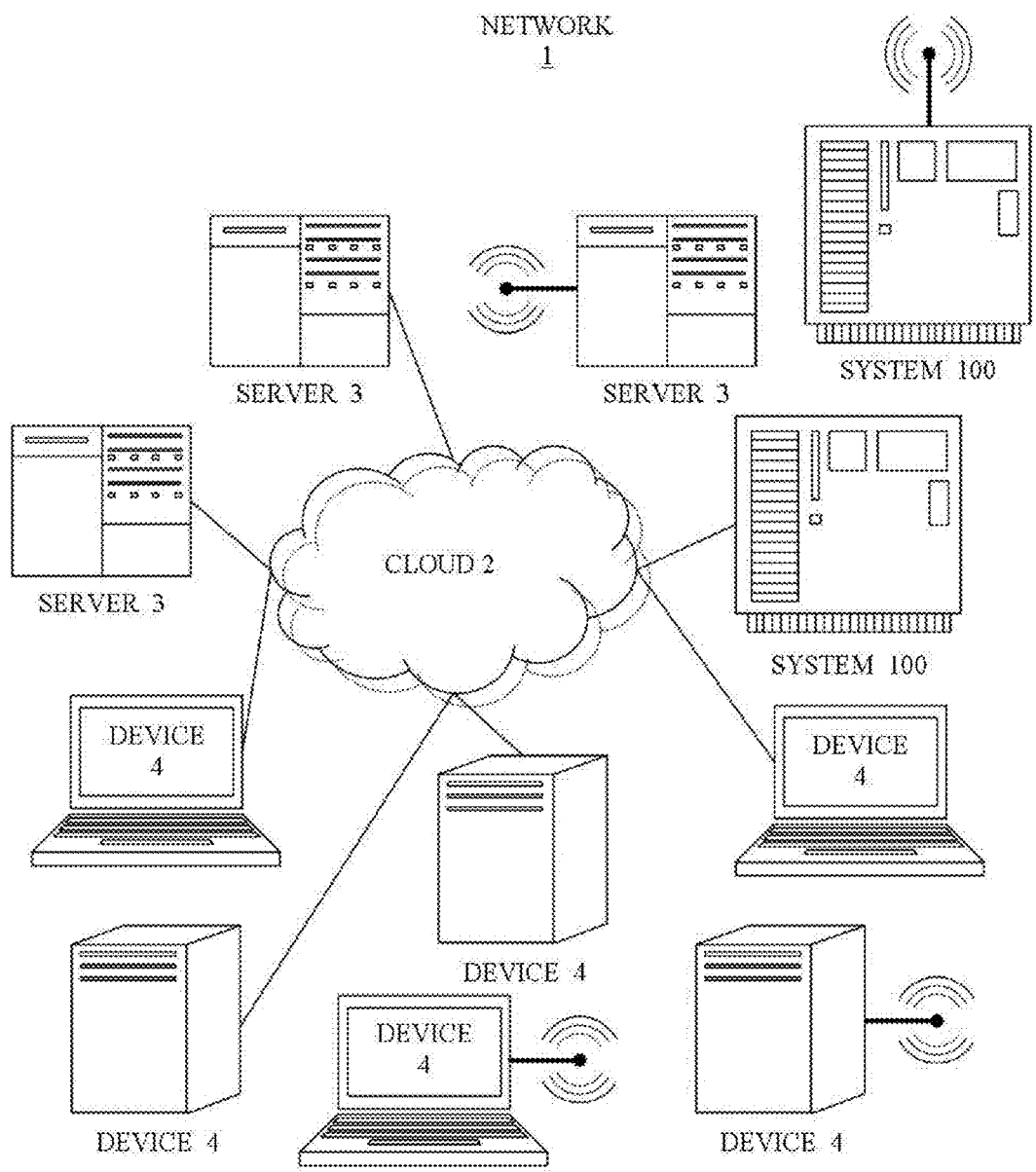
FIG. 1 is a schematic representation of a network for a user to access a source code version control system.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While certain example systems and methods disclosed herein may be described with reference to mainframes in cloud computing, systems and methods disclosed herein may be related to architecture and information technology ("IT") service and asset management in cloud computing, as well as usability and user experience in middleware and common services. Systems and methods disclosed herein may be applicable to a broad range of applications that monitor various parameters associated with various disciplines, such as, for example, IT systems and other activities of importance to the user.

Referring now to computing systems, in existing systems, when a user wants to compare various versions of source code, the user may need to compare the different versions one by one. However, comparing versions of source code one by one may be very inefficient and slow, especially if there are several set of changes made to a component of the source code.

Systems and methods disclosed herein may allow a user to build a tree structure based on a component of the source code. The tree structure may be built by a language-specific parser (i.e., a parsing device). For example, for JAVA, the root node of a tree structure may be an application, and descendants (e.g., child nodes) of the tree structure may include component, file, class, method, code block, and statement. A component of the source code may be created and stored in a source code repository. When the component is being stored, the language-specific parser may format the component into the previously-created tree structure, for example, by locating the specific node relevant to the content of the component and adding the component to the node, or may create a new node connected to a previous node to add the content of the newly-created component.

Such systems and methods may check out specific components of the source code to a user, and may check in the component into a version control system of the source code repository after changes are made. When a user makes changes to the component, the version control system analyzes the changes by controlling the language-specific parser to format the changes into an updated tree structure by updating the relevant portion of the tree structure associated with the component based on content. In addition, the version control system may include a change flag, comments, or a timeline entry noting the change, which may be user-input and/or generated by the system.

Such systems and methods may locate changes to specific components of the source code based on content at the request of a user. For example, when the user wants to determine when and why one piece of component was introduced, the version control system may format the piece of component to the associated node of the updated tree structure and track all change histories of the node and any descendant nodes. In addition, the user may define how many levels of ancestor nodes the locator can expand to and provide changes histories for.

Such systems and methods may provide a list of related versions of the components of a node so that a user may locate when the relevant nodes were first introduced. The user can then review the context of the node, any descendant nodes, and/or any ancestor nodes, and any relevant flags, comments or timeline entries. In this way, because changes are tracked by content (e.g., tracked by their location in the node of the tree structure of the source code), any useless versions (e.g., versions that contain non-substantive or cosmetic changes only) may be easily determined and filtered out. Such systems and method may list the change histories based on content, allowing a user to analyze when and why changes occurred by reading version information. In addition, by comparing how many changes happened in each version, the user easily determine the most important version changes that occurred (e.g., the version in which a substantial portion of the component was first introduced or later changed).

Advantages of such systems and method may include: the ability to locate a version of a component of source code based on content, rather than locating only the changes to the code by comparing code and/or component versions one by one; comparing later versions to initial versions of code and/or components directly, rather than comparing only one generation of changes with the next generation of changes; the ability to easily determine the most important version changes and filter out versions that incorporate only minor, non-substantive changes; and provide more details about the changes to the user, e.g., change flags, change comments, and/or timeline of changes.

Referring now to FIG. 1, a network 1 for a user to access and use a source code version control system is shown. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information among users that are connected to cloud 2.

Network 1 may comprise one or more servers 3 and other devices operated by service providers and users. Network 1 also may comprise one or more devices 4 utilized by users. Service providers and users may provide information to each other utilizing the one or more servers 3, which connect to the one or more devices 4 via cloud 2. Servers 3 may comprise, for example, one or more of general purpose computing devices, specialized computing devices, mainframe devices, wired devices, wireless devices, monitoring devices, infrastructure devices, and other devices configured to provide information to service providers and users. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service providers and users.

Moreover, network 1 may comprise one or more systems 100 that may provide a source code version control system. System 100 may be, for example, one or more of a general purpose computing device, a specialized computing device, a wired device, a wireless device, a mainframe device, an infrastructure device, a monitoring device, and any other device configured to provide an integrated video module. System 100 may also be configured to collect data from one or more data sources (e.g., servers, sensors, networks, interfaces, other devices). System 100 may collect information from network 1, cloud 2, servers 3, devices 4, and other devices connected to cloud 2. System 100 may connect to cloud 2 and monitor network 1, cloud 2, servers 3, devices 4, and other devices connected to cloud 2 for available information. The available information may be user information, location information, access information, performance information, infrastructure information, software or application information, usability information, and other information provided by service providers and users. By collecting the available information from network 1, cloud 2, servers 3, devices 4, and other devices connected to cloud 2, system 100 may perform one or more tasks associated with using the source code version control system, as discussed below In some configurations, one or more of servers 3 and devices 4 may comprise system 100. In other configurations, system 100 may be separate from servers 3 and devices 4.

Figure 2:
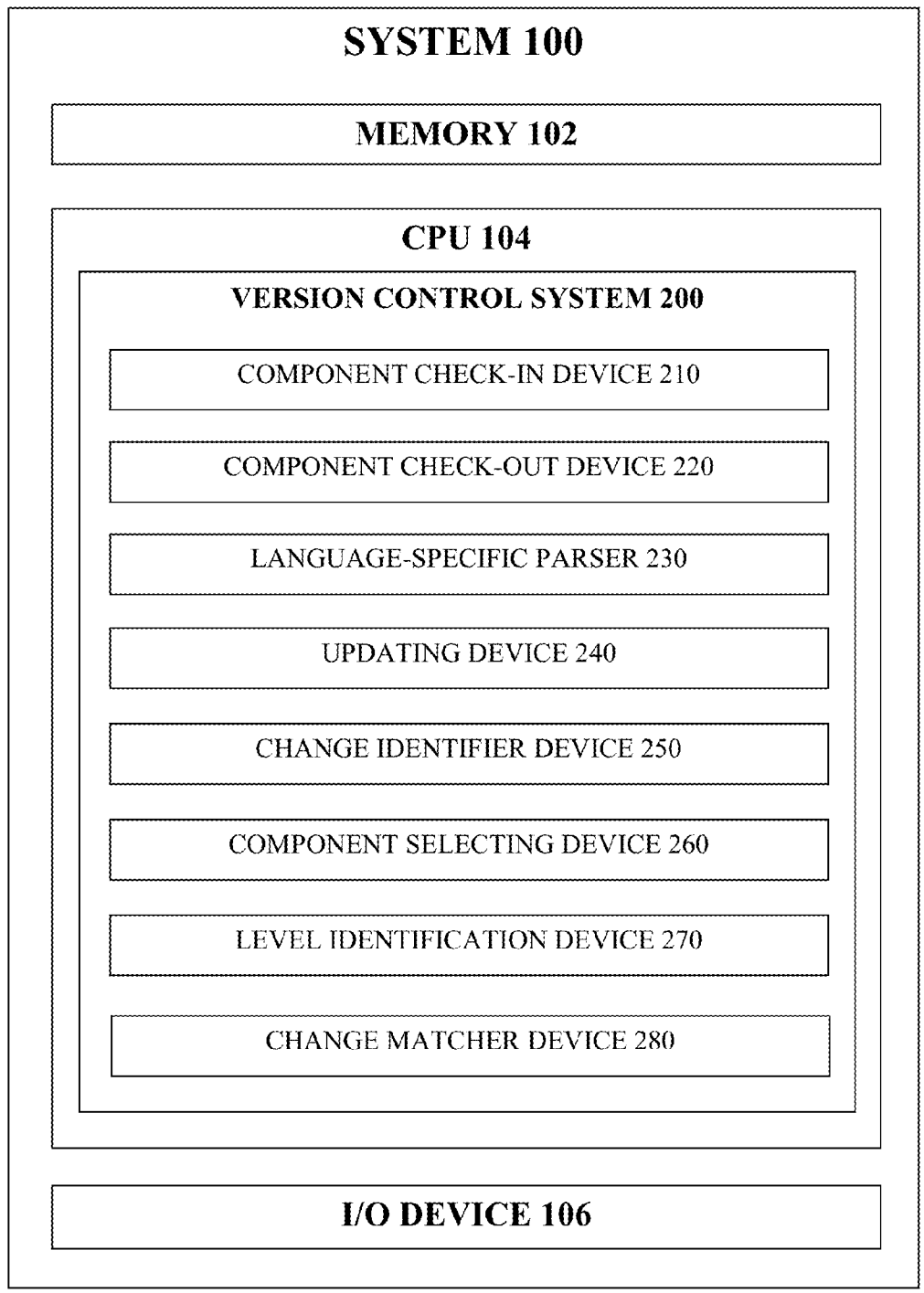
FIG. 2 is a schematic representation of a system configured to locate changes in a source code version control system.

Referring now to FIG. 2, system 100, which may provide a source code version control system, is now described. System 100 may reside on one or more networks 1. System 100 may comprise a memory 102, a central processing unit ("CPU") 104, and an input and output ("I/O") device 106.

Memory 102 may store computer-readable instructions that may instruct system 100 to perform certain processes. Memory 102 may comprise, for example, RAM, ROM, EPROM, Flash memory, or any suitable combination thereof. In particular, when executed by CPU 104, the computer-readable instructions stored in memory 102 may instruct CPU 104 to operate as one or more devices.

CPU 104 may operate as a version control system 200. Version control system 200 may comprise a component check-in device 210, a component check-out device 220, a language-specific parser 230, an updating device 240, a change identifier device 250, a component selecting device 260, a level identification device 270, and a change matcher device 280. In some configurations, one or more of version control system 200 may be implemented on one or more CPUs, which may be comprised on devices 4 or other devices.

I/O device 106 may receive one or more of data from networks 1, data from other devices and sensors connected to system 100, and input from a user and provide such information to CPU 104. I/O device 106 may transmit data to networks 1, may transmit data to other devices connected to system 100, and may transmit information to a user (e.g., display the information via a display device). Further, I/O device 106 may implement one or more of wireless and wired communication between system 100 and other devices.

Figure 3:
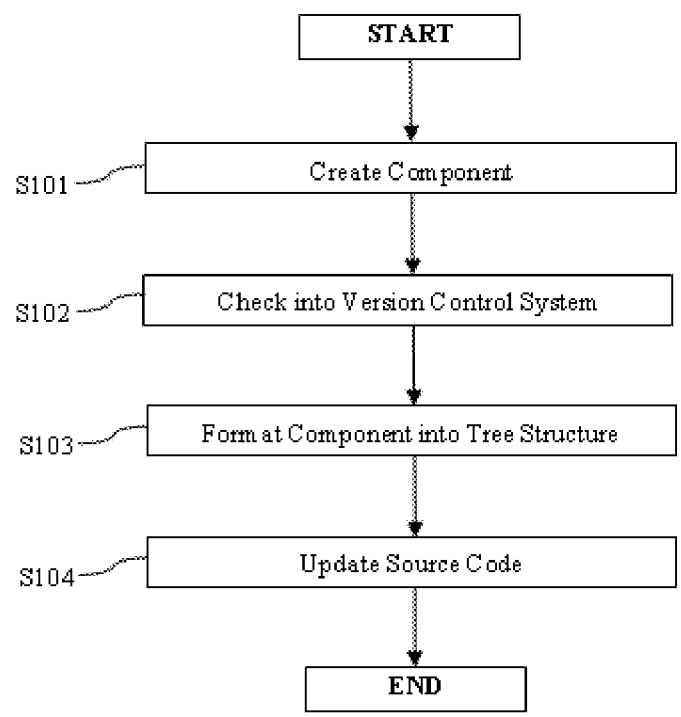
FIG. 3 illustrates a process of creating a source code component formatted to a tree structure.
Figure 4:
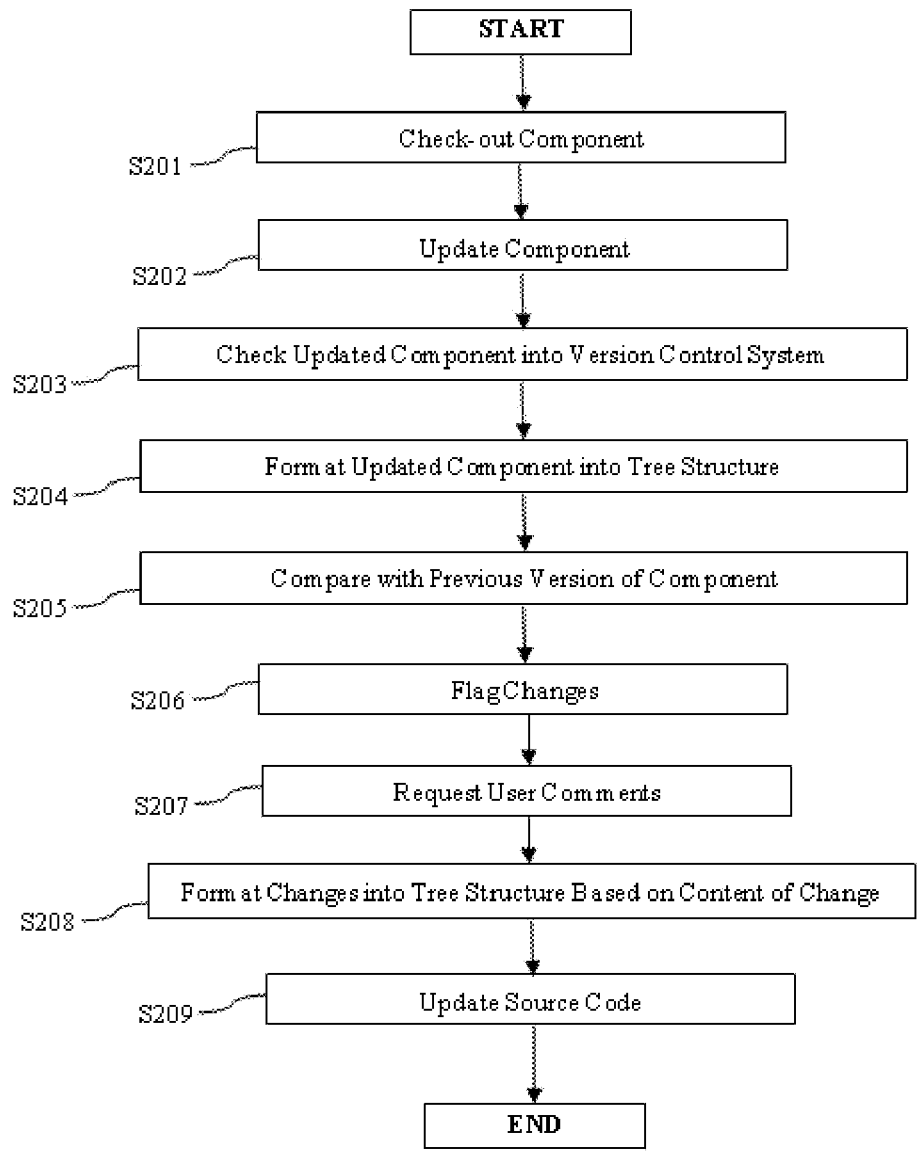
FIG. 4 illustrates a process of checking-in an updated version of the source code component.
Figure 5:
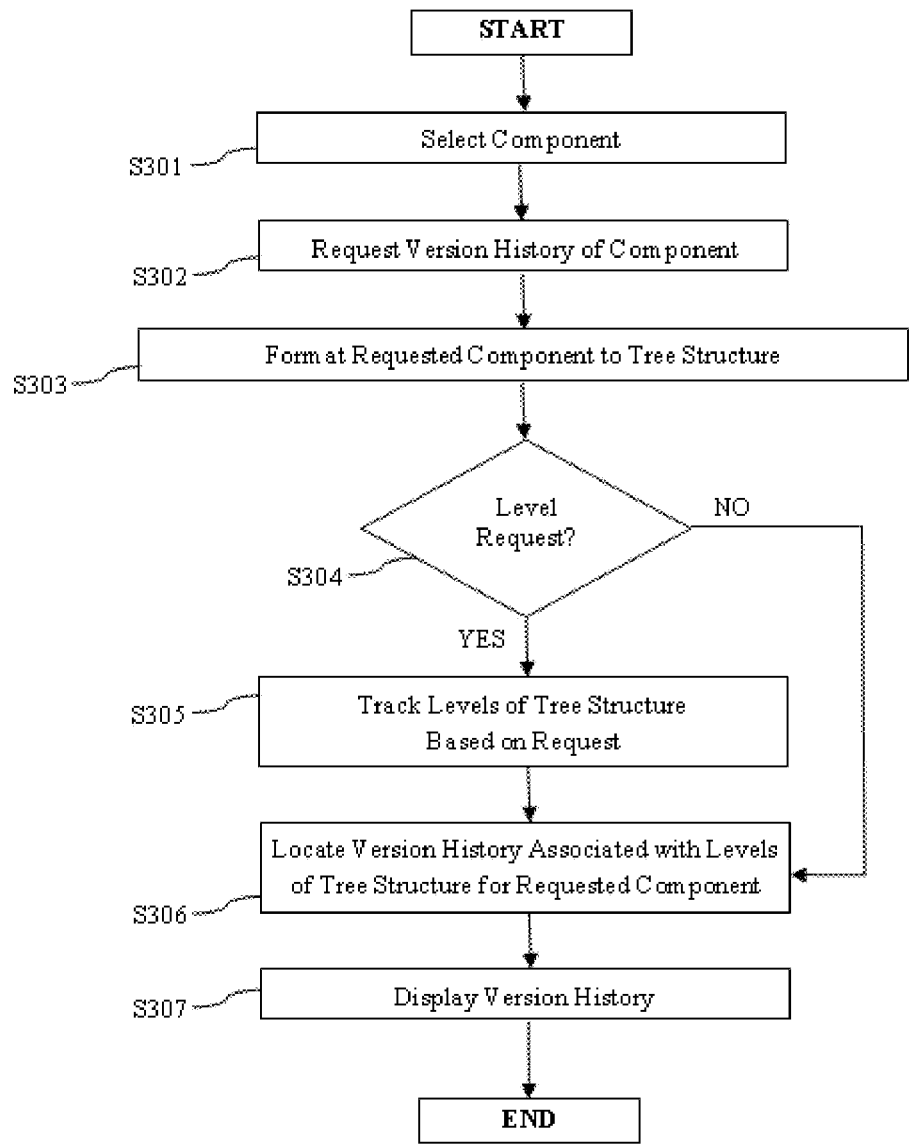
FIG. 5 illustrates a process of presenting a version history of the changes to the source code component.

Referring now to FIG. 3-5, processes performed version control system 200 are now described.

FIG. 3 depicts a process of creating a source code component formatted to a tree structure. In S101, version control system 200 may allow a user to create a component. Then, in S102, version control system 200, operating as a component check-in device 210, may allow the user to check the new component into version control system 200. In S103, version control system 200, operating as a language-specific parser 230, may format the new component into the tree structure by parsing source code of a software product to format the software product into a tree structure comprising a plurality of components, each component comprising respective content. For example, the tree structure corresponds to a plurality of categories associated with a language. If the content of the new component is associated with an existing category (i.e., node) of the tree structure, the existing node and/or relevant descendant nodes may be updated to incorporate the component. In addition, for example, if the content of the new component is not associated with, but is related to, an existing node of the tree structure, a new node may be created to incorporate the component into the source code. Version control system 200 may separate each of the plurality of components among the tree structure based upon the respective content.

In S104, version control system 200, operating as an updating device 240, may update the previously created source code with a new version of the source code incorporating the new component, and store the new version of the source code in a storage device (e.g., memory 102, or any other suitable storage device). After the new version of the source code is stored, the process may terminate.

Referring now to FIG. 4, a process of checking-in an updated version of the source code component is now described. In S201, version control system 200, operating as a component check-out device 220, may allow a user to check out a component, and in S202, the user may update the component with substantive and/or non-substantive revisions. After the user revises the component, in S203, component check-in device 210 may allow the user to check in the updated component to version control system 200. Then, in S204, language-specific parser 230 may format the updated component into the tree structure of the source code based on the content of the updated component. Version control system 200 may separate each of the plurality of components among the tree structure based upon the respective content. Then, version control system 200 may receive, at a source code repository, an updated version of a component of the plurality of components.

In S205, version control system 200, operating as a change identifier device 250, may compare the updated version component with the previously checked-out version of the component, and in S206, may flag changes and/or create a timeline entry for the updated component when compared with the previously checked-out version of the component. In S207, change identifier device 250 may request user comments with regard to the identified change and/or may associate the change with preset keywords or categories. In S208, version control system 200 may update the source code by formatting the changes and any associated information (e.g., flagged changes, time entry, user comments, preset keywords/categories) into the tree structure of the source code by associating the identified changes with the respective content of the updated version of the component, and store the new version of the source code and the identified changes of the updated version of the component in the storage device. After the tree structure of the source code is updated by replacing the previously checked-out version of the component with the updated version of the component, the process may terminate.

Referring now to FIG. 5, a process of presenting a version history of the changes to the source code component is now described. In S301, version control system 200, operating as a component selecting device 260, may allow a user to select one piece of, or an entirety of, a component of the source code to review any changes made to the component. In S302, component selecting device 260 may request version information and/or history associated with the selected component, resulting in language-specific parser 230 finding the requested component to the tree structure to obtain information on, for example, the node corresponding to the requested component and any descendant nodes (S303).

Then, in S304, version control system 200, operating as a level identification device 270, may request user settings on how many levels the user wants to track the changes through ancestor nodes of the node corresponding to the requested component. If the user inputs a selected number of levels of ancestor nodes (S304: YES), in S305, level identification device 270 may track the levels of the tree structure corresponding to the requested levels of ancestor nodes, and retrieve information associated with the requested levels of ancestor nodes. Then, in S306, version control system 200, operating as a change matcher device 280, may find the components of the tree structure associated with the selected component, in addition to the information associated with the requested levels of ancestor nodes, and may retrieve the change histories associated with all nodes of relevant portions of the tree structure for the user-requested component. Moreover, in S304, if the user does not input any levels of ancestor nodes (S304: NO), the process proceeds directly to S306.

Then, in S307, once all relevant information is retrieved, version control system 200 outputs all versions of changes and the associated change histories for the user-requested component, including, e.g., flagged changes, time entry, user comments, preset keywords/categories. For example, version control system 200 may output the updated version of the component, the identified changes with the updated version of the component, and the previously checked-out version of the component. In addition, version control system 200 may optionally determine which versions of changes are not valuable (e.g., contain no substantive changes, contains only minor changes, contain only cosmetic changes, and any other relevant factors), and may flag and/or remove those versions so that only valuable versions of changes are selected. This information is then outputted to the user via I/O device 106, and then the process terminates.

Example 1

The following example is presented for purposes of illustration and description. An example of the process will be discussed herein of one component that contains JAVA® language Class GreetingController.

```
Pack sample.greeting;
public class GreetingController {
   private static final String template = "Hello,%s!";
   private final AtomicLong counter = new AtomicLong( );
   public Greeting greeting(String name) {
      if(name.equals("World")){
         name = "Universe";
         System.out.println("You are boring!");
      }
      return new Greeting(counter.incrementAndGet( ), String.format(template, name));
   }
}
```

In this example, a JAVA® language parser may identify a structure such as the following:

```
ID: GreetingController  TYPE: Class  PATH: sample.greeting
   ID: template   TYPE: Property   PATH: sample.greeting/property
CONTENT: private static final String template = "Hello, %s"
   ID: counter   TYPE: Property   PATH: sample.greeting/property
CONTENT: private final AtomicLong counter = new AtomicLong( );
   ID: greeting   TYPE: Function   Path: sample.greeting/function
CONTENT: private final AtomicLong counter = new AtomicLong( );
      ID: greeting_BLOCK_1   TYPE: Block   PATH:
sample.greeting/function/block/1   CONTENT:
if(name.equals("World")){ name =
"Universe";System.out.println("You are boring!"); }
         ID: greeting_BLOCK_1_STATEMENT_1    TYPE: Statement
PATH: sample.greeting/function/block/1/statement/1
CONTENT: name = "Universe";
         ID: greeting_BLOCK_1_STATEMENT_2   TYPE: Statement
PATH: sample.greeting/function/block/1/statement/2   CONTENT:
System.out.println("You are boring!");
         ID: greeting_STATEMENT_1   TYPE: Statement  PATH:
sample.greeting/function/statement/1   CONTENT: return new
Greeting(counter.incrementAndGet( ), String.format(template, name));
```

Next, in this example, a user may update the code and change "Universe" to "Jackson":

```
Package sample.greeting;
public class GreetingControler {
   private static final String template = "Hello, %s";
   private final AtomicLong counter = new AtomicLong( );
   public Greeting greeting(String name) {
      if(name.equals("World")){
         Name = "Jackson";
         System.out.println("You are boring!");
      }
      return new Greeting(counter.incrementAndGet( ), String.format(template, name));
   }
}
```

When the user checks the change into a version control system, the JAVA® language parser may identify its change scope, and may store the following into a database:
 (1) Copy and archive the item to be updated:
  ID: greeting_BLOCK_1_STATEMENT_1 TYPE: Statement PATH: sample.greeting/function/block/1/statement/1 Content: name="Universe"; VERSION:1
 (2) Update present item:
  ID: greeting_BLOCK_1_STATEMENT_1 TYPE: Statement PATH: sample.greeting/function/block/1/statement/1 CONTENT: name="Jackson";
 (3) Update the change to the Archive item. For example, the following updates the characters from 8 to 16
  ID: greeting_BLOCK_1_STATEMENT_1 TYPE: Statement PATH: sample.greeting/function/block/1/statement/1 CONTENT: name="Universe" VERSION: 1 CHANGE: 8/16/JACKSON;

In the development environment, a user may want to obtain information about "name='Universe'" by following these steps:

(1) The user may select any part of the string "name='Universe.'"

(2) The user may then identify a searching scope, for example, extending the searching scope to statement level, block level, function level, class level, or component level.

(3) Then, information based on the selected searching scope may be provided to the user. For example, the user may select statement level, and may want to obtain information on when the change was introduced to the version control system. Based on this search, the user may receive the following information:

[DATE] Added name="Universe"
[DATE] Edited name="Jackson"

The flowchart and block diagrams in FIGS. 1-5 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for providing a source code version control system, comprising:
    parsing source code of a software product to format the software product into a tree structure comprising a plurality of components, each component comprising respective content;
    separating each of the plurality of components among the tree structure based upon the respective content;
    receiving, at a source code repository, an updated version of a component of the plurality of components;
    comparing the updated version of the component to a previously checked-out version of the component to identify changes;
    flagging the identified changes in the updated version with change flags;
    in response to identifying the identified changes, requesting comments regarding the identified changes;
    receiving user comments regarding the identified changes;
    associating the identified changes with the respective content of the updated version of the component;
    storing the identified changes of the updated version of the component, the change flags, and the user comments;
    updating the tree structure by replacing the previously checked-out version of the component with the updated version of the component; and
    presenting, based on a selected component, the updated version of the component, the identified changes with the updated version of the component, and the previously checked-out version of the component.

2. The method of claim 1, wherein the step of parsing the source code into a tree structure includes using a language-specific parser.

3. The method of claim 1, wherein the tree structure corresponds to a plurality of categories associated with a language.

4. The method of claim 1, further comprising, prior to presenting the updated version of the component, the identified changes with the updated version of the component, and the previously checked out version of the component:
    receiving a number of levels of the tree structure from the user,
    determining components of the tree structure that correspond to the received number of levels of the tree structure, and
    presenting the updated versions of the components of the tree structure that correspond to the received number of levels, the changes associated with the components of the tree structure that correspond to the received number of levels of the tree structure, and the previously checked-out versions of the component of the tree structure that correspond to the received number of levels.

5. The method of claim 1, further comprising: determining whether the updated version of the component is valuable or not valuable, wherein determining that the updated version of the component is not valuable comprises determining that the updated version of the component contains no substantive changes, wherein the changes of the updated version of the component are not presented in response to determining that the updated version is not valuable.

6. A system comprising:
    a parsing device configured to parse source code of a software product to format the software product into a tree structure comprising a plurality of components, each component comprising respective content;
a separating device configured to separate each of the plurality of components among the tree structure based upon the respective content;
a receiving device configured to receive, at a source code repository, an updated version of a component of the plurality of components;
a comparing device configured to compare the updated version of the component to a previously checked-out version of the component to identify changes;
the comparing device further configured to flag the identified changes in the updated version with change flags and, in response to identifying the identified changes, request comments regarding the identified changes;
the receiving device being further configured to receive user comments regarding the identified changes;
an associating device configured to associate the identified changes with the respective content of the updated version of the component;
a storing device configured to store the identified changes of the updated version of the component, the changes flags and the user comments;
an updating device configured to update the tree structure by replacing the previously checked-out version of the component with the updated version of the component; and
a presenting device configured to present, based on a selected component, the updated version of the component, the identified changes with the updated version of the component, and the previously checked-out version of the component.

7. The system of claim 6, wherein the parsing device comprises a language-specific parser.

8. The system of claim 6, wherein the tree structure corresponds to a plurality of categories associated with a language.

9. The system of claim 6, further comprising:
a second receiving device configured to receive a number of levels of the tree structure from the user;
a first determining device configured to determine components of the tree structure that correspond to the received number of levels of the tree structure, and
a second presenting device configured to present the updated versions of the components of the tree structure that correspond to the received number of levels, the changes associated with the components of the tree structure that correspond to the received number of levels of the tree structure, and the previously checked-out versions of the component of the tree structure that correspond to the received number of levels.

10. The system of claim 6, further comprising:
a second determining device configured to determine whether the updated version of the component is valuable,
wherein the changes of the updated version of the component are not presented if the updated version is determined to be not valuable.

11. A computer program product comprising:
a non-transitory, computer-readable storage medium having computer-readable program code embodied therewith, the computer-readable program code comprising:
computer readable program code configured to parse source code of a software product to format the software product into a tree structure comprising a plurality of components, each component comprising respective content;
computer readable program code configured to separate each of the plurality of components among the tree structure based on upon the respective content;
computer readable program code configured to receive, at a source code repository, an updated version of a component of the plurality of components;
computer readable program code configured to compare the updated version of the component to a previously checked-out version of the component to identify changes;
computer readable program code configured to flag identified changes in the updated version with change flags;
computer readable program code configured to, in response to identifying the identified changes, request comments regarding the identified changes;
computer readable program code configured to receive user comments regarding the identified changes
computer readable program code configured to associate the identified changes with the respective content of the updated version of the component;
computer readable program code configured to store the identified changes of the updated version of the component;
computer readable program code configured to update the tree structure by replacing the previously checked-out version of the component with the updated version of the component; and
computer readable program code configured to present, based on a selected component, the updated version of the component, the identified changes with the updated version of the component, and the previously checked-out version of the component.

12. The computer program product of claim 11, herein the tree structure corresponds to a plurality of categories associated with a language.

13. The computer program product of claim 11, further comprising: computer readable program code configured to receive a number of levels of the tree structure from the user;
computer readable program code configured to determine components of the tree structure that correspond to the received number of levels of the tree structure; and
computer readable program code configured to present the updated versions of the components of the tree structure that correspond to the received number of levels, the changes associated with the components of the tree structure that correspond to the received number of levels of the tree structure, and the previously checked-out versions of the component of the tree structure that correspond to the received number of level.

14. The computer program product of claim 11, further comprising: computer readable program code configured to determine whether the updated version of the component is valuable, wherein the changes of the updated version of the component are not presented if the updated version is determined to be not valuable.

* * * * *